UNITED STATES PATENT OFFICE.

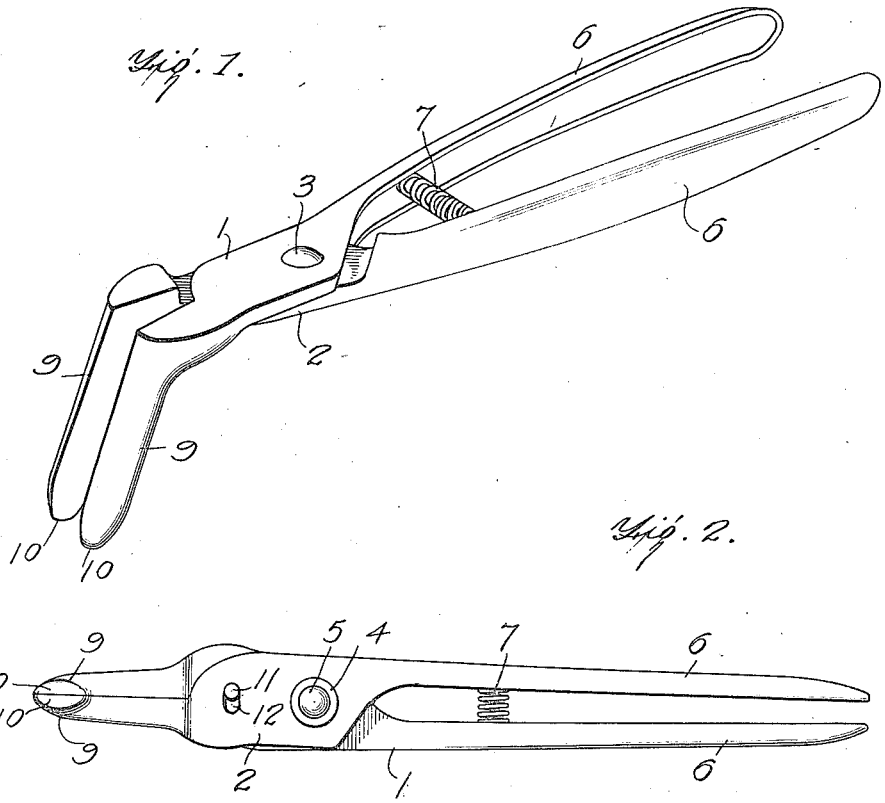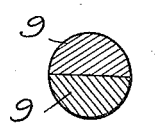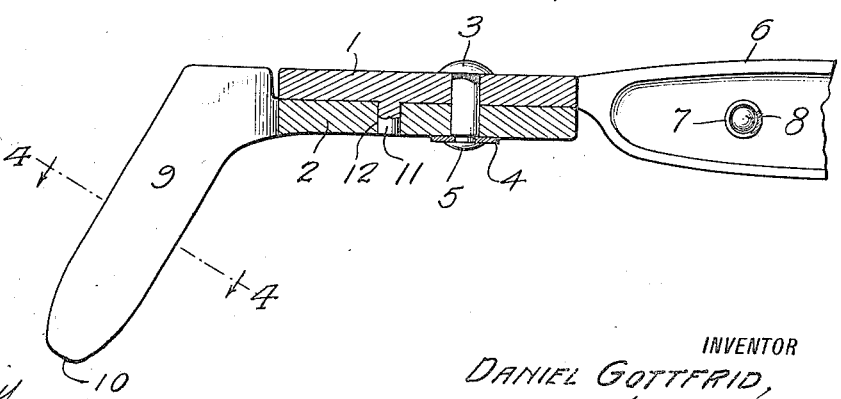

DANIEL GOTTFRID, OF KANSAS CITY, KANSAS.

WEED-PULLER.

1,093,400.

Specification of Letters Patent.  Patented Apr. 14, 1914.

Application filed June 20, 1913.  Serial No. 774,817.

*To all whom it may concern:*

Be it known that I, DANIEL GOTTFRID, a citizen of the United States, and a resident of Kansas City, in the county of Wyandotte and State of Kansas, have invented a new and useful Improvement in Weed-Pullers, of which the following is a specification.

My invention is an improvement in weed pullers, and has for its object a device of the character specified, capable of being held in the hand and having means for grasping and holding the weeds, so arranged that the weeds may be grasped lengthwise of the stalk, and beneath the surface of the ground if desired.

In the drawings: Figure 1 is a perspective view of the improved weed puller in open position, Fig. 2 is a bottom plan view in closed position, Fig. 3 is a longitudinal vertical section, and Fig. 4 is a transverse section of the gripping jaws, taken on the line 4—4 of Fig. 3, and looking in the direction of the arrows.

The present embodiment of the invention comprises a pair of crossed members, each consisting of a shank 1 and 2, pivoted together by means of a rivet 3, the said rivet having its lower end reduced to receive a washer 4, and the rivet is headed below the washer as indicated at 5. Each of the members 1 and 2 is provided with a grip or handle 6, the said handles being channeled on their inner face as shown, and the said handles are normally pressed away from each other by means of a coil spring 7, the said spring being arranged between the handles near their inner end, and each end of the spring fits over a pin 8, connected with the adjacent handle. On the opposite side of the pivotal connection from the grips or handles, each of the crossed members is provided with an angular lug or jaw 9, the said jaws extending from the crossed members or shanks at an obtuse angle as shown. The inner or meeting faces of the jaws are plane as shown to permit the jaws to fit flat against each other, and the free end of each jaw is rounded and pointed as shown at 10, to permit the said ends to enter the ground if necessary.

It will be noted from an inspection of Fig. 3, that each of the shanks is approximately rectangular in cross section and that the uppermost shank 1 is provided with a downwardly extending pin 11, which is received in a transverse slot 12 in the shank 2. The pin and slot limit the opening movement of the jaws, and the spring 7 normally holds the said jaws in the said open position.

In operation, the improved puller is held in the right hand, the spring 7 holding the jaws in open position. The pointed ends 10 of the jaws are pressed down into the soil on each side of the weed body and when in proper position to grasp the body and a portion of the root, the handles or grips are pressed together to clamp the jaws on the weed and the weed is pulled. The mere loosening of the grasp of the hand permits the spring to open the jaws and the weed to fall from between them.

The improved weed puller may be made of any suitable material as for instance wood or metal, and the shanks 1 and 2 are flattened so that when superposed they are of approximately the same thickness as the handles or grips. Each of the said crossed members including the grip 6 and the jaw 9, is an integral structure and the lower member is recessed on its upper face to receive the upper member, as shown in Fig. 3. The gripping faces of the jaws extend from the upper surface of each of the crossed members to the point of the jaw, so that when a weed is gripped between the jaws, the top thereof may extend above the shanks, without engaging the said shanks. That is, a weed may be gripped standing without bending the same.

I claim:—

A device of the character specified, comprising crossed members, each consisting of a shank having at one end a handle and having at the other end a gripping jaw extending at an obtuse angle from the crossed member, each of the jaws having a flat meeting face fitting against the face of the opposite jaw throughout the length of the jaw, said members being pivoted together at the shank, one of the members having a transverse slot between the pivotal connection and the jaw and the other member having a pin engaging the slot to limit the opening movement of the jaws, and a spring normally holding the jaws in open position, the said gripping surfaces extending from the upper surfaces of the crossed members to the free ends of the jaws.

DANIEL GOTTFRID.

Witnesses:
 EDWARD F. MCKENNA,
 GARRETT DILLON.